(12) United States Patent
Nishikiori et al.

(10) Patent No.: US 8,972,156 B2
(45) Date of Patent: Mar. 3, 2015

(54) CONTROL APPARATUS FOR INTERNAL COMBUSTION ENGINE

(75) Inventors: Takashi Nishikiori, Susono (JP); Norihisa Nakagawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 13/812,054

(22) PCT Filed: Oct. 27, 2010

(86) PCT No.: PCT/JP2010/069103
§ 371 (c)(1),
(2), (4) Date: Jan. 24, 2013

(87) PCT Pub. No.: WO2012/056535
PCT Pub. Date: May 3, 2012

(65) Prior Publication Data
US 2013/0255606 A1    Oct. 3, 2013

(51) Int. Cl.
*F02D 41/00*    (2006.01)
*F02D 13/08*    (2006.01)
*F02D 41/04*    (2006.01)
*F02N 19/00*    (2010.01)
*F02D 41/12*    (2006.01)
(Continued)

(52) U.S. Cl.
CPC . *F02D 41/00* (2013.01); *F01L 1/34* (2013.01); *B60K 6/24* (2013.01); *F02B 2275/16* (2013.01); *F02D 13/08* (2013.01); *F02D 41/042* (2013.01); *F02D 2041/001* (2013.01); *F02N 19/004* (2013.01); *Y02T 10/18* (2013.01); *F02D 41/126* (2013.01)
USPC ........................ 701/112; 123/90.1; 123/90.15

(58) Field of Classification Search
CPC ......... F02D 41/00; F02D 13/02; F02D 45/00; F02D 43/00; F01L 1/34; B60K 6/24
USPC .................. 701/112, 101, 102, 115; 123/90.1, 123/90.15, 90.11, 198 DB
See application file for complete search history.

(56) References Cited

U.S. PATENT DOCUMENTS 6,526,745 B1    3/2003  Ogiso
6,915,769 B2 *  7/2005  Yoshikawa et al. ........ 123/90.15
(Continued)

FOREIGN PATENT DOCUMENTS

JP    A-6-346711    12/1994
JP    A-7-119502    5/1995
(Continued)

*Primary Examiner* — Hieu T Vo
(74) *Attorney, Agent, or Firm* — Oliff PLC

(57) ABSTRACT

An engine includes an intake variable valve mechanism and an exhaust variable valve mechanism. An ECU causes all intake valves in all cylinders to stop in a closed state by means of intake variable valve mechanism when performing a fuel-cut operation, including when the engine is stopped. The ECU causes at least one exhaust valve in all cylinders to stop in an open state by means of exhaust variable valve mechanism. When executing a fuel-cut operation, needless compression can be avoided by stopping the exhaust valves in an open state, while protecting a catalyst from deterioration caused by contact with intake air by stopping the intake valves in a closed state. The amount of oil consumption of the engine, and electric power consumption, vibrations and a tendency for spontaneous ignition to occur at cranking time can be improved.

7 Claims, 10 Drawing Sheets

(51) Int. Cl.
  *F02D 13/02* (2006.01)
  *F01L 1/34* (2006.01)
  *B60K 6/24* (2007.10)

(56) References Cited

U.S. PATENT DOCUMENTS 7,765,964 B2 * 8/2010 Ichimoto .................... 123/90.15
8,141,533 B2 * 3/2012 Demura .................... 123/179.3

FOREIGN PATENT DOCUMENTS

| | | |
|---|---|---|
| JP | A-2001-182570 | 7/2001 |
| JP | A-2004-137969 | 5/2004 |
| JP | A-2007-9779 | 1/2007 |
| JP | A-2007-16710 | 1/2007 |
| JP | A-2007-107433 | 4/2007 |
| JP | A-2008-45460 | 2/2008 |
| JP | 2010261333 A * 11/2010 .............. F02D 13/02 |
| WO | WO 2007/042876 A2 | 4/2007 |

* cited by examiner

US 8,972,156 B2

CONTROL APPARATUS FOR INTERNAL COMBUSTION ENGINE

TECHNICAL FIELD

The present invention relates to a control apparatus for an internal combustion engine that includes a valve stopping mechanism that is favorably used, for example, as a vehicle engine.

BACKGROUND ART

As the conventional technology, a control apparatus for an internal combustion engine that includes a valve stopping mechanism that stops a valve in a closed state (subjects a valve to closed-valve stopping) is known, as disclosed, for example, in Patent Literature 1 (Japanese Patent Laid-Open No. 2001-182570). According to the conventional technology, a configuration is adopted so that, when executing a fuel-cut operation, at least one of an intake valve and an exhaust valve is subjected to closed-valve stopping. Thus, according to the conventional technology, a configuration is adopted that attempts to prevent fresh air (oxygen) that has been taken in during a fuel-cut operation from reaching a catalyst, and thereby protect the catalyst from degradation.

The applicants are aware of the following literature, which includes the above described literature, as literature related to the present invention.

CITATION LIST

Patent Literature

Patent Literature 1: Japanese Patent Laid-Open No. 2001-182570
Patent Literature 2: Japanese Patent Laid-Open No. 2007-9779
Patent Literature 3: Japanese Patent Laid-Open No. 7-119502
Patent Literature 4: Japanese Patent Laid-Open No. 2007-107433
Patent Literature 5: Japanese Patent Laid-Open No. 6-346711

SUMMARY OF INVENTION

Technical Problem

According to the conventional technology, a configuration is adopted which subjects a valve to closed-valve stopping at the time of a fuel-cut operation. However, for example, in a case where an intake valve is subjected to closed-valve stopping, each time that an exhaust stroke ends and an exhaust valve closes, the inside of the cylinder enters an airtight state. In this state, since a large negative pressure arises inside the cylinder when the piston descends, the amount of oil that is sucked into the cylinder from the crankcase increases. Consequently, according to the conventional technology, not only is there the problem that the amount of oil consumption increases and early replenishment of oil is required, there is also the problem that the oil that has been sucked into the cylinder mixes in with exhaust gas and causes the exhaust emissions to deteriorate.

In addition, for example, with respect to hybrid vehicles, there are cases where the engine is stopped while the vehicle is running, and hence there is a desire to protect the catalyst by executing the control of the conventional technology also when executing a fuel-cut operation that stops the engine. However, when the intake valve has been stopped in a closed state when the engine is stopped, in some cases the engine is restarted with the intake valve as it is in that state. In that case, since cranking is performed in a state in which the intake port is closed, the resistance when a piston is driven in a reciprocating motion becomes greater and the cranking load increases. Consequently, there is the problem that when the control of the conventional technology is applied to a fuel-cut operation at a time that the engine is stopped, the electric power consumption of the starter at startup increases and vibrations at cranking time also increase. Moreover, at cranking time, since the actual compression ratio increases due to the intake valve being stopped in a closed state, injected fuel is liable to spontaneously ignite prior to ignition and there is a concern that a shock such as a cranking shock will occur.

On the other hand, according to the control of the conventional technology, a configuration is also conceivable that subjects an exhaust valve to closed-valve stopping at the time of a fuel-cut operation. However, in this case, there is a concern that when the intake valve has opened, exhaust gas that is generated immediately prior to the fuel-cut operation will blow back into the intake passage. As a result, the problem will arise that an exhaust gas scavenging failure will occur when reverting from the fuel-cut operation and the exhaust emissions will deteriorate, and startability when restarting the engine will deteriorate.

The present invention has been conceived to solve the above described problems, and an object of the present invention is to provide a control apparatus for an internal combustion engine that, in the case of performing a fuel-cut operation, including a fuel-cut operation when the internal combustion engine is stopped, is capable of reducing the amount of oil consumption and suppressing electric power consumption and vibrations at cranking time, even in a state in which an intake valve is stopped in a closed state.

Means for Solving the Problem

A first aspect of the present invention is a control apparatus for an internal combustion engine, comprising:
an intake closed-valve stopping mechanism that is capable of stopping an intake valve in a closed state;
an exhaust open-valve stopping mechanism that is capable of stopping an exhaust valve in an open state; and
valve stopping control means that, in a case of executing a fuel-cut operation, including at a time the internal combustion engine is stopped, causes all intake valves in all cylinders to stop in a closed state by means of the intake closed-valve stopping mechanism, and causes at least one exhaust valve in all cylinders to stop in an open state by means of the exhaust open-valve stopping mechanism.

In a second aspect of the present invention, wherein the valve stopping control means is configured to stop the exhaust valves in an open state after stopping the intake valves in a closed state.

In a third aspect of the present invention, wherein the valve stopping control means is configured to execute an operation that stops the intake valves in a closed state and an operation that stops the exhaust valves in an open state during a same combustion cycle.

In a fourth aspect of the present invention, wherein:
the valve stopping control means comprises first valve stopping control means that stops the exhaust valves in an open state after stopping the intake valves in a closed state, and second valve stopping control means that executes an operation that stops the intake valves in a closed state and an operation that stops the exhaust valves in an open state during a same combustion cycle;

the control apparatus further comprising control switching means that actuates the first valve stopping control means in a case where a fuel-cut operation is executed in which rotation of a crankshaft continues, and actuates the second valve stopping control means in a case where a fuel-cut operation is executed in which the crankshaft stops.

In a fifth aspect of the present invention, the control apparatus for an internal combustion engine further comprising:

valve state detection means that detects a parameter in which an operating state of the intake valves is reflected; and intake failure detection means that performs failure detection with respect to the intake valves by means of the valve state detection means during a period from a time point at which it is estimated that the intake valves stop in a closed state until the exhaust valves stop in an open state.

In a sixth aspect of the present invention, the control apparatus for an internal combustion engine further comprising operating-time valve reversion control means that, in a case of reverting from a fuel-cut operation in a state in which the crankshaft of the internal combustion engine rotates, causes the intake valves to revert from a stopped state after causing the exhaust valves to revert from a stopped state.

In a seventh aspect of the present invention, the control apparatus for an internal combustion engine further comprising:

valve state detection means that detects a parameter in which an operating state of the exhaust valves is reflected; and exhaust failure detection means that performs failure detection with respect to the exhaust valves by means of the valve state detection means during a period from a time point at which it is estimated that the exhaust valves revert from a stopped state until the intake valves revert from a stopped state.

In an eighth aspect of the present invention, the control apparatus for an internal combustion engine further comprising starting-time valve reversion control means that, in a case of restarting the internal combustion engine, causes the intake valves to revert from a stopped state, and causes the exhaust valves to revert from a stopped state at a time point at which the intake valves revert or thereafter.

In a ninth aspect of the present invention, wherein the starting-time valve reversion control means is configured to cause the exhaust valves to revert from a stopped state after cranking is started.

Advantageous Effects of Invention

According to the first invention, when executing a fuel-cut operation, the valve stopping control means can cause intake valves of each cylinder to stop in a closed state (closed-valve stopping), and also cause at least one exhaust valve of each cylinder to stop in an open state (open-valve stopping). Therefore, when executing a fuel-cut operation, while protecting a catalyst from deterioration caused by contact with intake air by the closed-valve stopping of the intake valves, needless compression can be avoided by the open-valve stopping of the exhaust valves. Accordingly, the amount of oil consumption of the internal combustion engine can be suppressed, and at a time of restarting, the electric power consumption of the starter, and vibrations and a tendency to spontaneously ignite at cranking time and the like can be improved.

According to the second invention, the valve stopping control means can subject exhaust valves to open-valve stopping after subjecting intake valves to closed-valve stopping. Therefore, for example, even when there are response variations or the like in a valve train, closed-valve stopping of intake valves can be executed prior to open-valve stopping of exhaust valves. Accordingly, a situation in which open-valve stopping is executed first due to response variations in a valve train or the like can be prevented, and intake air can be reliably prevented from flowing out to the exhaust side at the time of a fuel-cut operation.

According to the third invention, the valve stopping control means can execute an operation that subjects intake valves to closed-valve stopping and an operation that subjects exhaust valves to open-valve stopping during (that is, as early as possible in) the same combustion cycle. Therefore, for example, even when using a hydraulic valve stopping mechanism that does not operate, when the internal combustion engine is stopped, when a fuel-cut operation is performed at a time that the internal combustion engine is stopped, both closed-valve stopping of intake valves and open-valve stopping of exhaust valves can both be completed without fail. Accordingly, by using the valve stopping control means, an advantageous effect when restarting can be stably exerted. Further, a period in which only intake valves are stopped can be shortened to less than a single cycle, and suction of oil (the amount of oil consumption) can be suppressed to a minimum.

According to the fourth invention, the control switching means can appropriately use first valve stopping control means that corresponds to the second invention and second valve stopping control means that corresponds to the third invention in accordance with whether or not rotation of the crankshaft is continuing at the time of execution of a fuel-cut operation. It is thus possible to exert to the maximum the advantageous effects obtained by the valve stopping control means in respective operating states.

According to the fifth invention, the intake failure detection means can perform an operation to detect a failure of an intake valve during a period from a time point at which it is estimated that the intake valve has stopped in a closed state until an exhaust valve stops in an open state. Accordingly, for example, even without executing valve control for failure detection or the like, a valve failure can be easily detected by utilizing a delay period that arises when stopping valves and thus the system reliability can be improved.

According to the sixth invention, when reverting from a fuel-cut operation performed in a state in which the crankshaft rotated, the operating-time valve reversion control means can cause exhaust valves to revert from open-valve stopping and thereafter cause intake valves to revert from closed-valve stopping. Thus, when reverting from a fuel-cut operation also, it is possible to reliably prevent intake valves from opening first and intake air from reaching the catalyst.

According to the seventh invention, the exhaust failure detection means can perform an operation to detect a failure of an exhaust valve during a period from a time point at which it is estimated that the exhaust valve has reverted from open-valve stopping until an intake valve reverts from closed-valve stopping. Accordingly, a valve failure can be easily detected by utilizing a delay period at a time of valve reversion, and thus the system reliability can be improved.

According to the eighth invention, the starting-time valve reversion control means can cause intake valves to open before exhaust valves close at a time of restarting, and thus a situation in which the inside of a cylinder enters an airtight state at cranking time can be avoided. As a result, since the cranking load can be reduced, electric power consumption of the starter can be decreased and vibrations at cranking time can be lessened.

According to the ninth invention, at least at an initial stage of cranking, an exhaust valve can be opened in advance, and an adequate rotational inertial force can be imparted to a flywheel or the like in a state in which the resistance of a piston (crankshaft) is small. Accordingly, even if exhaust valves close and the rotational resistance of the crankshaft increases, the load of the starter can be reduced by utilizing a rotational inertial force of the flywheel or the like, and the electric power consumption of the starter can be reduced further.

BRIEF DESCRIPTION OF DRAWINGS

FIG. 8 is a timing chart that illustrates second valve stopping control in Embodiment 2 of the present invention.

DESCRIPTION OF EMBODIMENTS

Embodiment 1
[Configuration of Embodiment 1]

Figure 1:
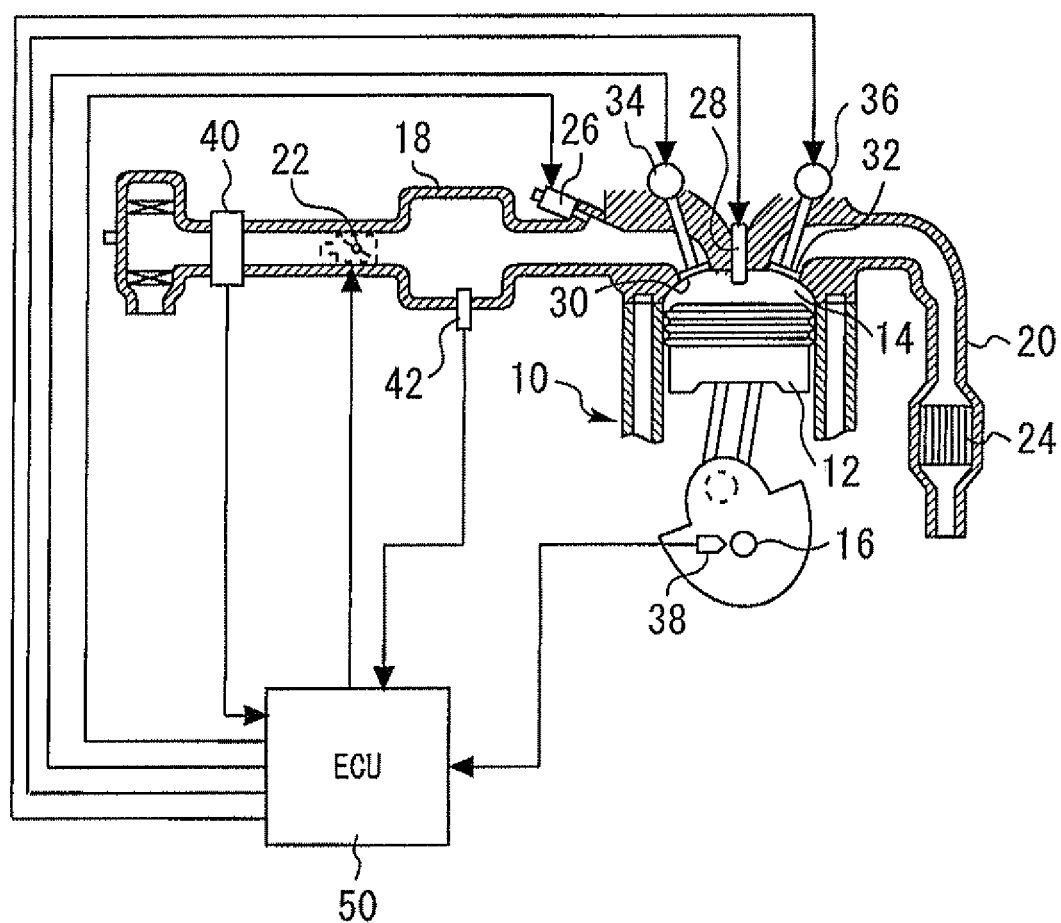
FIG. 1 is an overall configuration diagram for describing the system configuration of Embodiment 1 of the present invention.

Hereunder, Embodiment 1 of the present invention is described while referring to FIG. 1 to FIG. 6. FIG. 1 is an overall configuration diagram for describing the system configuration of Embodiment 1 of the present invention. The system of the present embodiment includes an engine 10 as an internal combustion engine. In each cylinder of the engine 10, a combustion chamber 14 is formed by a piston 12, and the piston 12 is connected to a crankshaft 16 of the engine. The engine 10 includes an intake passage 18 that draws intake air into each cylinder, and an exhaust passage 20 through which exhaust gas is discharged from each cylinder. An electronically controlled throttle valve 22 that adjusts an intake air amount is provided in the intake passage 18. A catalyst 24 such as a three-way catalyst that purifies exhaust gas is provided in the exhaust passage 20.

Each cylinder is provided with a fuel injection valve 26 that injects fuel into an intake port, a spark plug 28 that ignites an air-fuel mixture in the cylinder, an intake valve 30 that opens and closes the intake port with respect to the inside of the cylinder, and an exhaust valve 32 that opens and closes an exhaust port with respect to the inside of the cylinder. The engine 10 also includes an intake variable valve mechanism 34 that variably sets valve opening characteristics of the intake valve 30, and an exhaust variable valve mechanism 36 that variably sets valve opening characteristics of the exhaust valve 32.

The intake variable valve mechanism 34 has a known configuration as described, for example, in Japanese Patent Laid-Open No. 2008-45460. Specifically, the intake variable valve mechanism 34 is equipped with two arms which are swingably supported, respectively, and a connecting mechanism that executes operations to connect the respective arms and to release a connection therebetween. The two arms are disposed between a drive cam provided on a camshaft on the intake side of the engine and a rocker aim of the intake valve 30. In a state in which the respective arms are connected, since an input of the drive cam is transmitted from one of the arms to the other of the arms, the intake valve 30 opens and closes. In contrast, when the connection between the arms is released, swinging of one of the arms is not transmitted to the other of the arms, and the intake valve 30 is stopped in a closed state. Thus, the intake variable valve mechanism 34 is equipped with a function that causes intake valves 30 of the respective cylinders to stop in a closed state (hereunder, referred to as "closed-valve stopping") even in an intake stroke, and constitutes an intake closed-valve stopping mechanism of the present embodiment.

On the other hand, the exhaust variable valve mechanism 36 is constituted by an electromagnetically-driven valve mechanism or the like as described, for example, in Japanese Patent Laid-Open No. 2007-16710, and includes a solenoid that is capable of causing the exhaust valve 32 to open by magnetic force. By controlling a time period in which a current is applied to the solenoid and an applied voltage and the like, the exhaust variable valve mechanism 36 can variably set valve opening characteristics (opening timing, closing timing and lift amount) of the exhaust valve 32. Thus, the exhaust variable valve mechanism 36 is equipped with a function that causes exhaust valves 32 of the respective cylinders to stop in an open state (hereunder, referred to as "open-valve stopping") even at a timing other than an exhaust stroke, and constitutes an exhaust open-valve stopping mechanism of the present embodiment.

Note that, although the electromagnetically driven exhaust variable valve mechanism 36 is described as an example according to the present embodiment, the present invention is not limited thereto, and a configuration may be adopted in which a hydraulic variable valve mechanism is used as the exhaust open-valve stopping mechanism. As one example, in a hydraulic exhaust variable valve mechanism that may be applied to the present invention, two drive cams are provided on a cam shaft on an exhaust side in correspondence with a single exhaust valve, and a configuration is adopted so that the single exhaust valve is opened and closed by means of the two drive cams. The two drive cams have working angles in which the phases deviate from each other, and a hydraulic actuator can be used to connect the two drive cams to each other or to release the connection therebetween. When subjecting the exhaust valve to open-valve stopping, by connecting the two drive cams, the working angles of the respective drive cams are combined and thus the working angle of the cam overall is increased. It is thereby possible to extend the open period of the exhaust valve and realize substantial open-valve stopping.

Next, a control system of the system will be described. The system according to the present embodiment includes a sensor system that includes respective sensors 38, 40 and 42, and an ECU (Electronic Control Unit) 50 that controls the operating state of the engine 10. First, the sensor system will be described. A crank angle sensor 38 outputs a signal that is synchronous with rotation of the crankshaft 16. An airflow sensor 40 detects an intake air amount of the engine. Further, an intake air pressure sensor 42 detects a pressure (intake air pressure) inside the intake passage 18. The intake air pressure is one of the parameters in which the operating states of the intake valve 30 and the exhaust valve 32 are reflected, and the intake air pressure sensor 42 constitutes valve state detection means of the present embodiment.

The sensor system also includes various sensors that are required to control the engine 10 or a vehicle in which the engine 10 is mounted (for example, a water temperature sensor that detects a temperature of the engine cooling water, an air-fuel ratio sensor that detects the exhaust air-fuel ratio, and an accelerator sensor that detects an accelerator operation amount of a driver). These sensors, including the respective sensors 38, 40 and 42, are connected to an input side of the ECU 50. Further, various actuators including the throttle valve 22, the fuel injection valve 26, the spark plug 28, and the variable valve mechanisms 34 and 36 are connected to an output side of the ECU 50.

The ECU 50 is constituted, for example, by an arithmetic processing apparatus that includes a storage circuit such as a ROM or a RAM, and an input/output port. The ECU 50 controls the operation of the engine 10 by driving each actuator based on operating information of the engine that is detected by the sensor system. More specifically, the ECU 50 detects the number of engine revolutions and the crank angle based on the output of the crank angle sensor 38, and calculates a load based on an intake air amount that is detected by the airflow sensor 40 and the number of engine revolutions. The ECU 50 also calculates a fuel injection amount based on the number of engine revolutions, the load and the like, and decides the fuel injection timing and the ignition timing based on the crank angle. For each cylinder, the ECU 50 drives the fuel injection valve 26 at a time point at which a fuel injection timing has been reached, and drives the spark plug 28 at a time point at which an ignition timing has been reached.

Thus, the ECU 50 can cause an air-fuel mixture inside the combustion chamber 14 of each cylinder to combust and thereby operate the engine 10. Note that, the above described operation control includes a fuel-cut operation that stops fuel injection from the fuel injection valve 26 at a time of deceleration of the engine or when the engine is stopped. The above described operation control also includes valve timing control that controls valve opening characteristics of each intake valve 30 and exhaust valve 32 by driving the variable valve mechanisms 34 and 36 based on the operating state of the engine.

[Features of Embodiment 1]

Figure 2:
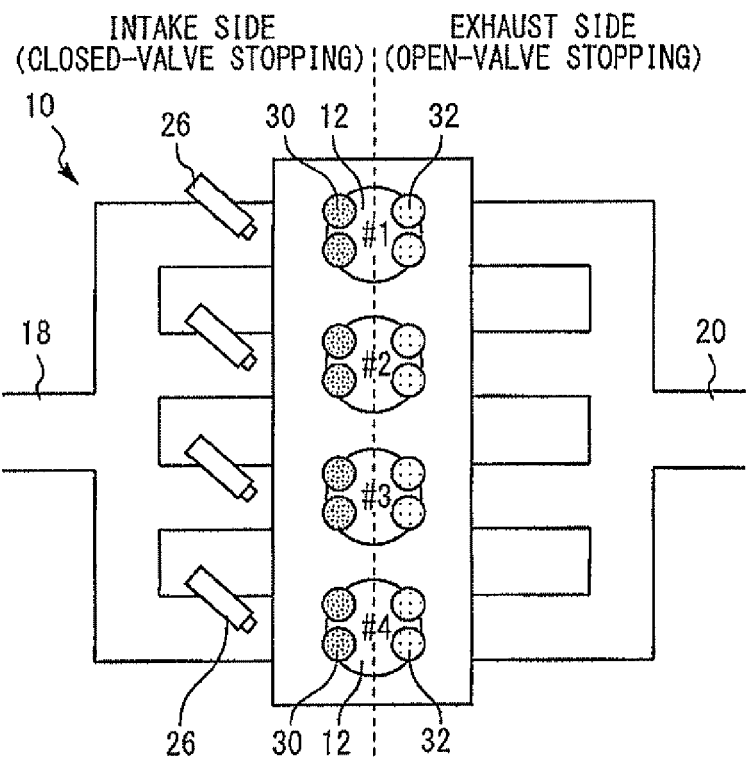
FIG. 2 is an explanatory drawing that illustrates an operating state of each valve when a fuel-cut operation is executed according to Embodiment 1 of the present invention.
Figure 3:
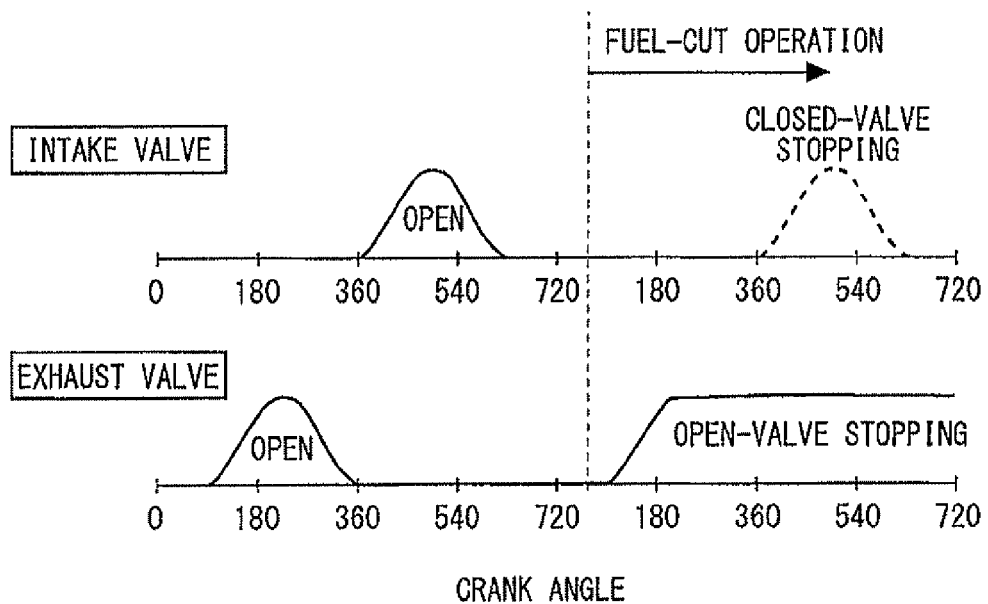
FIG. 3 is a timing chart that illustrates a control state (lift amount) of each valve at the time of a fuel-cut operation.

FIG. 2 is an explanatory drawing that illustrates an operating state of each valve when a fuel-cut operation is executed according to Embodiment 1 of the present invention. FIG. 3 is a timing chart that illustrates a control state (lift amount) of each valve at the time of a fuel-cut operation. As shown in FIGS. 2 and 3, according to the present embodiment, when a fuel-cut operation is executed, all the intake valves 30 of the respective cylinders are subjected to closed-valve stopping by the intake variable valve mechanism 34 and at least one exhaust valve 32 in each of the cylinders is subjected to open-valve stopping by the exhaust variable valve mechanism 36. In the following description, this control is referred to as "valve stopping control". Fuel-cut operations that are the object of valve stopping control include not only a fuel-cut operation that is executed at a time of deceleration of the engine, but also a fuel-cut operation that is executed when the engine is stopped.

Figure 4:
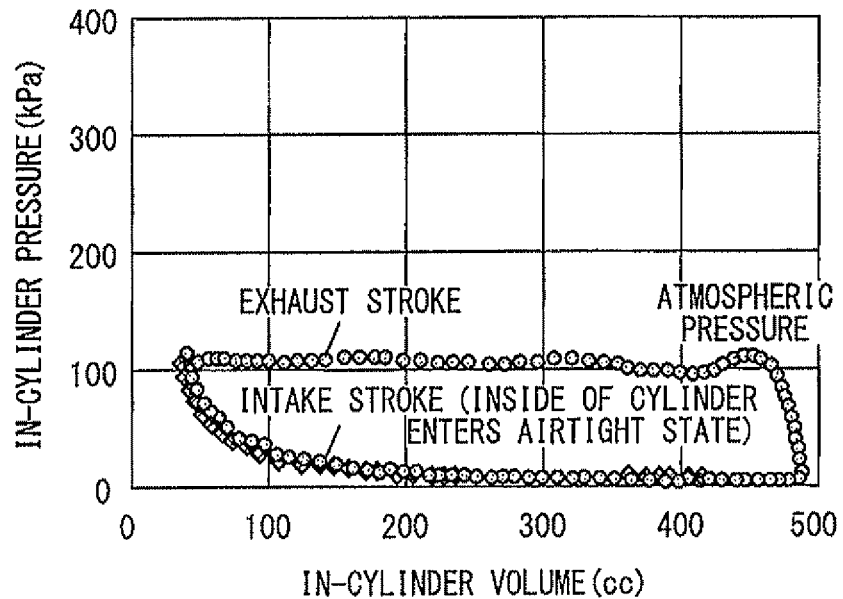
FIG. 4 is a characteristics diagram that illustrates the relationship between in-cylinder pressure and in-cylinder volume when intake valves are closed in a stopped state.

Next, operational advantages of the valve stopping control are described. First, at a time of execution of a fuel-cut operation, when intake valves and exhaust valves perform normal opening/closing operations there is a risk that air that is drawn into the engine will pass through the inside of the cylinders and reach the catalyst 24, and that consequently the catalyst 24 will come in contact with oxygen and deteriorate. Therefore, at the time of a fuel-cut operation, it is preferable to stop the intake valves or exhaust valves in a closed state to block the circulation of air. However, in a case where valves are merely stopped in a closed state, such as in the conventional technology, a timing arises at which both the intake valves and exhaust valves are closed during a combustion cycle, and consequently at such time the inside of the cylinder enters an airtight state. FIG. 4 is a characteristics diagram that illustrates the relationship between in-cylinder pressure and in-cylinder volume when intake valves are closed in a stopped state. As shown in FIG. 4, when intake valves have been subjected to closed-valve stopping, in an intake stroke a large load arises inside the relevant cylinder that has entered an airtight state. As a result, oil on the crankcase side is sucked up strongly into the cylinder and the amount of oil consumption increases.

In contrast, according to the present embodiment, since the intake valve 30 stops in a closed state and the exhaust valve 32 stops in an open state, the pressure inside the cylinder can be released by means of the exhaust valve 32 while blocking the flow of air to the catalyst 24 by means of the intake valve 30. Thus, at a time of a fuel-cut operation, during an intake stroke as shown in FIG. 4 also, the pressure inside the cylinder can be maintained at a similar level (level close to atmospheric pressure) as that during an exhaust stroke. As a result, suction of oil can be suppressed and the amount of oil consumption can be reduced, and exhaust emissions can also be improved. Further, since the intake valve 30 is subjected to closed-valve stopping, it is possible to prevent exhaust gas that remains inside a cylinder from blowing back into the intake passage 18, and thus exhaust gas scavenging characteristics can be improved.

According to the present embodiment, valve stopping control is executed not only at the time of a fuel-cut operation that is performed during operation of the engine, but also when executing a fuel-cut operation that stops the engine. The reason for this is as follows. Generally, since rotation of the crankshaft 16 stops after execution of a fuel-cut operation that stops the engine, intake air does not reach the catalyst 24. However, for example, in a case where the engine is stopped while the vehicle is running downhill or the like, in some cases the crankshaft 16 is dragged by the inertial force of the vehicle and continues to rotate even after execution of the fuel-cut operation (hereunder, rotation of the crankshaft after the engine stopped is referred to as "idle running"). In addition, for example, in a hybrid vehicle that combines the use of an engine and a motor, in some cases the crankshaft 16 is caused to run idle by the motor after execution of a fuel-cut operation. In these cases, even in a state in which the engine is stopped, there is a risk that intake air will be supplied to the catalyst 24 accompanying idle running of the crankshaft 16.

Figure 5:
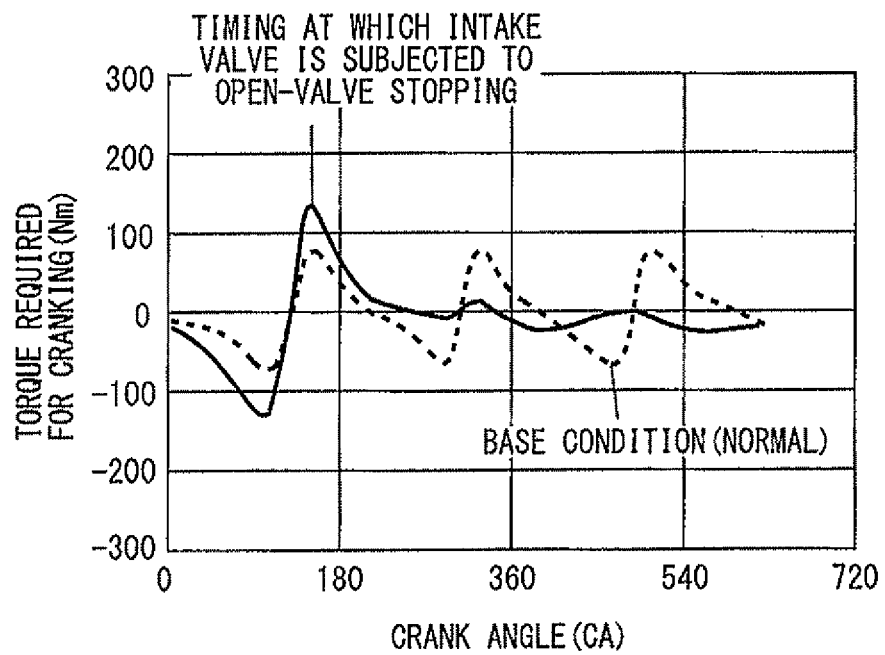
FIG. 5 is a characteristics diagram that illustrates torque that is required for cranking when an intake valve is stopped in a closed state.

In this respect, according to the valve stopping control, the intake valve 30 can be subjected to closed-valve stopping even when the engine is stopped. Accordingly, it is possible to prevent intake air being supplied to the catalyst 24 accompanying idle running of the crankshaft 16, and thereby protect the catalyst 24 from contact with oxygen. Further, if the intake valve 30 is subjected to closed-valve stopping when the engine is stopped, at a time of restarting, in some cases cranking may be performed in a state in which the intake valve 30 is maintained in a closed-valve stopped state. In particular, in a hydraulic variable valve mechanism, since release of closed-valve stopping is delayed at startup when the hydraulic pressure supply is insufficient, a situation is liable to occur in which cranking is started while the intake valve 30 is stopped in a closed state. FIG. 5 is a characteristics diagram that illustrates torque that is required for cranking when an intake valve is stopped in a closed state. As shown in FIG. 5, when the intake valve 30 is stopped in a closed state at startup, since the piston is driven in a reciprocating motion in a state in which the intake port is closed, the cranking load increases due to an air reaction force inside the cylinder.

However, according to the valve stopping control, since the exhaust valve 32 is subjected to open-valve stopping when the engine is stopped, at a time of restarting, cranking can be smoothly performed while releasing the pressure in the cylinder by means of the exhaust valve 32. Thus, even when the intake valve 30 is stopped in a closed state, the cranking load can be reduced, and the electric power consumption of the starter and the vibrations when cranking can be suppressed. Further, by performing the open-valve stopping with respect to the exhaust valve 32, the actual compression ratio when cranking can be decreased and the occurrence of spontaneous ignition of injected fuel or cranking shock or the like can be avoided.

Furthermore, according to the valve stopping control, since the intake valve 30 is subjected to closed-valve stopping when the engine is stopped, it is possible to prevent a situation in which exhaust gas that has blown back due to a residual pressure of intake negative pressure remains in the intake passage 18. Consequently, when restarting, it is possible to prevent the occurrence of a starting failure that is caused by residual blowback gas in the intake passage 18, and thereby improve the startability.

[Specific Processing to Realize Embodiment 1]

Figure 6:
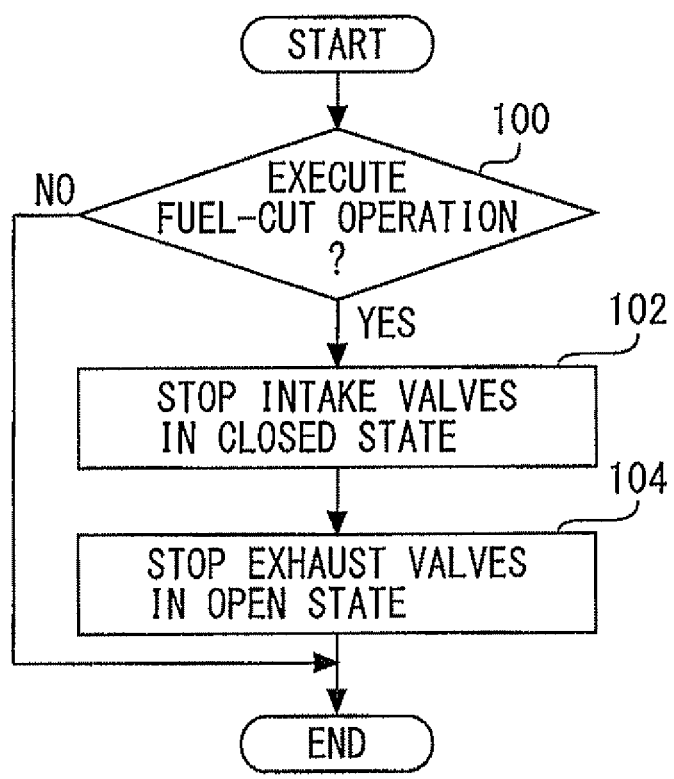
FIG. 6 is a flowchart that illustrates control that is executed by the ECU according to Embodiment 1 of the present invention.

Next, specific processing for implementing the above described control is described with reference to FIG. 6. FIG. 6 is a flowchart that illustrates control that is executed by the ECU according to Embodiment 1 of the present invention. It is assumed that the routine shown in FIG. 6 is repeatedly executed while the engine is operating (also including when the engine stops). According to the routine shown in FIG. 6, first, in step 100, based on an output of the sensor system, the ECU 50 determines whether or not the current timing is a timing at which to execute a fuel-cut operation. If the result determined in step 100 is affirmative, in step 102 the ECU 50 causes the intake valve 30 to be subjected to closed-valve stopping by the intake variable valve mechanism 34. Furthermore, in step 104, the ECU 50 causes the exhaust valve 32 to be subjected to open-valve stopping by the exhaust variable valve mechanism 36.

As described above, according to the present embodiment, when executing a fuel-cut operation, while protecting the catalyst 24 from deterioration, needless compression can be avoided by open-valve stopping of the exhaust valve 32. As a result, the amount of oil consumption of the engine, the electric power consumption and vibrations at cranking time, and a tendency for spontaneous ignition to occur can be improved. In particular, in a hybrid vehicle, because a motor is used as auxiliary power, the frequency at which stopping and restarting of the engine 10 and execution of a fuel-cut operation are performed is high. Further, in a vehicle that performs idling stop control also, stopping and restarting of the engine 10 are repeated at high frequency. Accordingly, in these vehicles, the advantageous effects of valve stopping control can be noticeably exerted. Note that, the term "idling stop control" refers to known control that temporarily stops the engine at the time of an idling operation, and automatically restarts the engine when reverting to normal operation.

In the above described Embodiment 1, steps 100, 102 and 104 in FIG. 6 represent a specific example of "valve stopping control means". Further, in FIG. 6, as a control example, an example is described in which step 104 in which the exhaust valve 32 is subjected to open-valve stopping is executed after step 102 in which the intake valve 30 is subjected to closed-valve stopping. However, according to the present invention it is sufficient to execute steps 102 and 104 as a series of operations, and the order of execution is not limited to that described in FIG. 6. That is, according to the present invention, valve stopping control may be executed in the order of steps 102 and 104, or the intake valve 30 may be subjected to closed-valve stopping after subjecting the exhaust valve 32 to open-valve stopping. Furthermore, closed-valve stopping and open-valve stopping may be executed at the same time.

Further, the present invention is intended to perform operations to stop the respective valves 30 and 32 when executing a fuel-cut operation, and the present invention does limit a temporal before-and-after relationship between the execution timing of a fuel-cut operation (timing at which fuel injection is stopped) and valve stopping. That is, according to the present invention, when executing a fuel-cut operation, valve stopping may be executed after stopping fuel injection, or conversely fuel injection may be stopped after executing valve stopping, or furthermore, stopping of fuel injection and valve stopping may be executed simultaneously.

In addition, according to Embodiment 1, in FIG. 2, a configuration is illustrated in which two intake ports and two exhaust ports are provided in each cylinder of a four-cylinder engine. However, the present invention is not limited to the configuration of FIG. 2, and may be applied to an internal combustion engine with an arbitrary number of cylinders, including one cylinder, and an arbitrary number of intake ports and exhaust parts.

Embodiment 2

Next, Embodiment 2 of the present invention is described with reference to FIG. 7 to FIG. 9. A feature of the present embodiment is that, with a similar configuration to that of the above described Embodiment 1, the timing for stopping each valve is set in accordance with the operating state during a fuel-cut operation. Note that, according to the present embodiment, components that are the same as in Embodiment 1 are denoted by the same reference symbols, and a description of such components is omitted hereunder.

[Features of Embodiment 2]

Figure 7:
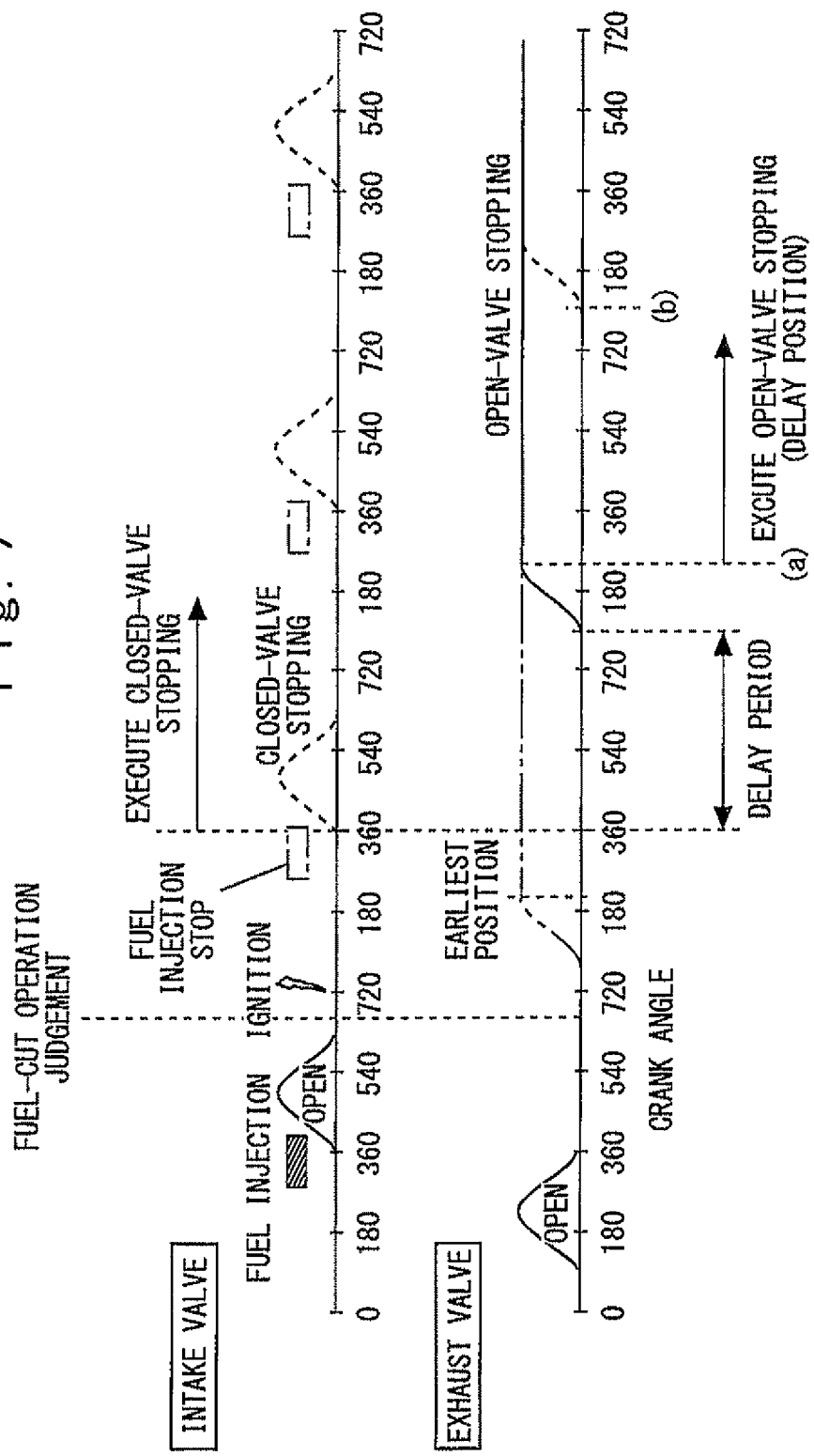
FIG. 7 is a timing chart that illustrates first valve stopping control and FIG. 8 is a timing chart that illustrates second valve stopping control in Embodiment 2 of the present invention.
Figure 8:
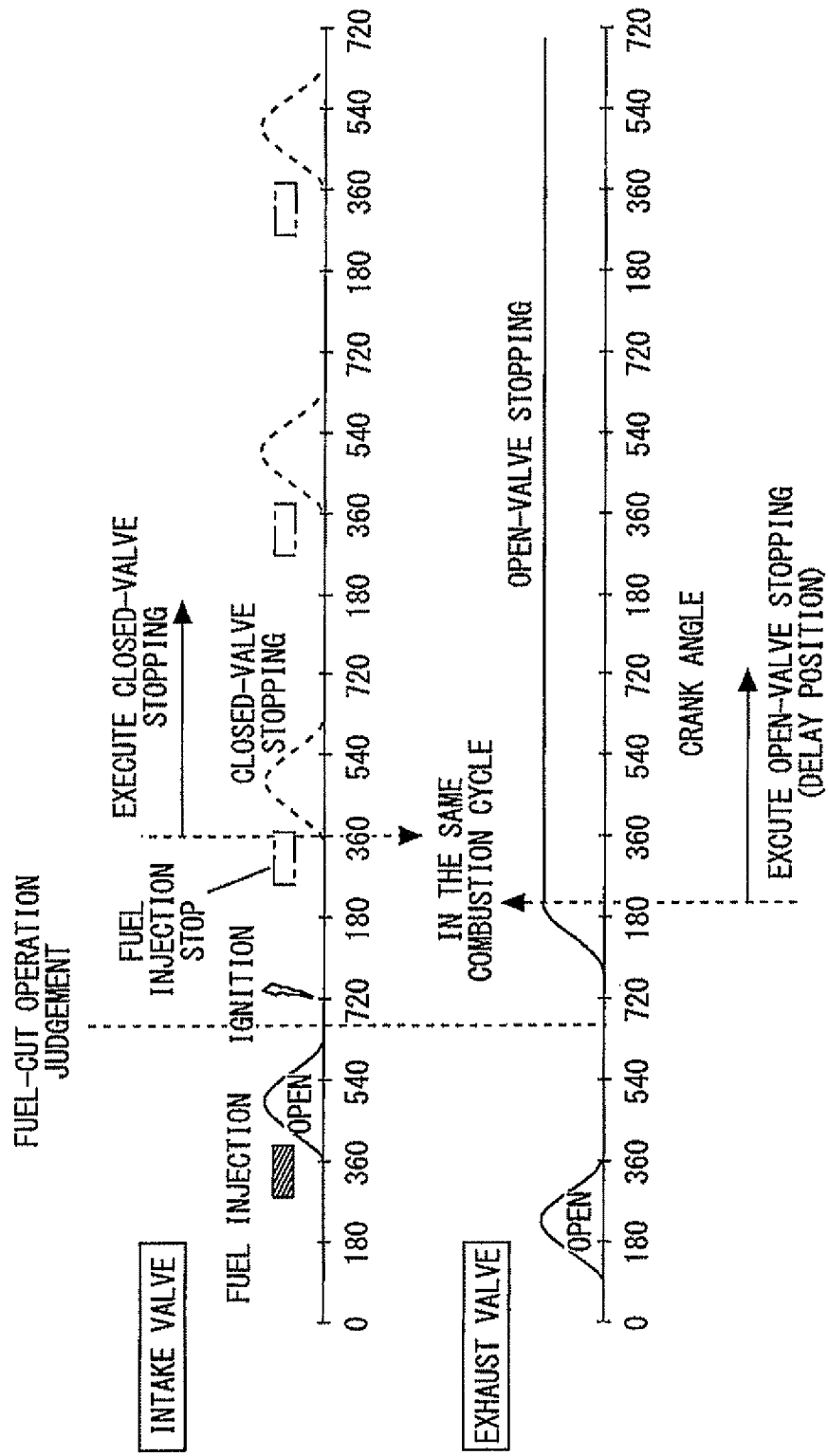

FIG. 7 is a timing chart that illustrates first valve stopping control and FIG. 8 is a timing chart that illustrates second valve stopping control in Embodiment 2 of the present invention. According to the present embodiment a configuration is adopted that executes the first valve stopping control when a fuel-cut operation in which the crankshaft 16 runs idle is executed, and executes the second valve stopping control when a fuel-cut operation in which the crankshaft 16 stops is executed. Hereunder, these valve stopping controls are described.

(First Valve Stopping Control)

Fuel-cut operations in which the crankshaft 16 runs idle include (1) a fuel-cut operation that is performed in a case where, even when the engine is stopped, the crankshaft 16 is dragged by an inertial force of the vehicle and continues to rotate, and (2) in a hybrid vehicle, a fuel-cut operation that is performed in a case where rotation of the crankshaft 16 is continued by a motor in a state in which the engine is stopped. According to the first valve stopping control, when these fuel-cut operations are executed, valve stopping and the like is executed in the order illustrated in FIG. 7.

More specifically, according to the first valve stopping control, when a decision to execute a fuel-cut operation has been made, first, the intake valve 30 is subjected to closed-valve stopping in synchrony with the fuel-cut operation. Further, after a certain period of time has elapsed after closed-valve stopping, for example, at a delay position (a) in FIG. 7, the exhaust valve 32 is subjected to open-valve stopping. This delay position is set, for example, as a timing that is delayed by between about one to several cycles of a fuel cycle (720° CA) of the engine with respect to an earliest position at which, theoretically, open-valve stopping can be executed earliest after a decision to perform a fuel-cut operation has been made.

As a result, a delay period is provided within a period from a time point at which the intake valve 30 stopped in a closed state until the exhaust valve 32 stops in an open state (see FIG. 7). As described later, a configuration may be adopted that executes failure detection control with respect to the intake valve 30 during this delay period. Note that, although the delay position (a) in FIG. 7 represents an example of a case where timing of open-valve stopping is delayed by one cycle and a delay position (b) represents an example of a case where timing of open-valve stopping is delayed by two cycles, the present invention is not limited to these delay positions. Further, in a case where there are no constraints in terms of the system, including the exhaust variable valve mechanism 36 and the like, it is not necessary to set delay positions in combustion cycle units.

According to the above described first valve stopping control, the following advantageous effects can be obtained. First, there are cases where response variations caused by mechanical differences or individual differences arise between an intake valve train and an exhaust valve train, and this tendency is particularly noticeable when using a hydraulic variable valve mechanism. Therefore, for example, when a hydraulic mechanism is adopted as the intake variable valve mechanism 34, there are cases where a response delay occurs when subjecting the intake valve 30 to closed-valve stopping. However, even in such a case, according to the first valve stopping control, the closed-valve stopping of the intake valve 30 can be executed before the open-valve stopping of the exhaust valve 32. Accordingly, it is possible to prevent open-valve stopping being executed first due to response variations of a valve train including the variable valve mechanisms 34 and 36 or the like, and reliably prevent intake air from flowing out to the exhaust side at the time of a fuel-cut operation.

In addition, during a fuel-cut operation in which the crankshaft 16 runs idle, even when a hydraulic exhaust variable valve mechanism is adopted, a hydraulic pressure supply can be received and operations performed. That is, when executing valve stopping control, a situation does not occur in which the crankshaft 16 abruptly stops at a time point at which the intake valve 30 is subjected to closed-valve stopping and it is not possible to execute open-valve stopping with respect to the exhaust valve 32. Consequently, open-valve stopping of the exhaust valve 32 can be intentionally delayed, and a delay of the open-valve stopping can be allowed. Therefore, according to the first valve stopping control, a delay period that is in accordance with a delay of the open-valve stopping can be provided, and failure detection control with respect to the intake valve can be executed utilizing this delay period, and thus the system reliability can be improved.

Further, for the above described reasons, since it is not necessary to subject the exhaust valve 32 to open-valve stopping at the earliest position, a response delay of a certain extent can be allowed in the exhaust variable valve mechanism 36. Therefore, for example, an inexpensive exhaust variable valve mechanism in which the level of responsiveness is not particularly high can be employed to thereby lower the cost of the system. Note that, during the aforementioned delay period, since a negative pressure in the cylinder increases, suction of oil is liable to proceed. However, since the suction of oil proceeds comparatively sluggishly, the oil suction can be ignored in a short time period of around several cycles.

(Intake Valve Failure Detection Control)

Failure detection control is executed based on an intake air pressure detected by the intake air pressure sensor 42 during the delay period. When the intake valve 30 stops in a closed state normally, the intake negative pressure decreases compared to when normal opening/closing operations are performed, and the intake air pressure becomes substantially equal to the atmospheric pressure. For example, an intake air pressure during closed-valve stopping is previously stored as a determination value in the ECU 50. Subsequently, in the failure detection control, during a delay period in which it is estimated that closed-valve stopping has been completed, if a detection value of the intake air pressure is lower than the determination value, the ECU 50 determines that a failure whereby the intake valve 30 has not stopped in a closed state has occurred. Further, in a case where the detection value of the intake air pressure is substantially equal to the determination value, it is determined that the intake valve 30 is normal. Note that, when executing the above described failure detection control, it is preferable to previously confirm by means of another failure detection control that the exhaust valve 32 is normal.

Thus, according to the present embodiment, for example, even without executing valve control for failure detection or the like, a failure of the intake valve 30 can be easily detected by utilizing a delay period at the time of valve stopping. Note that, it is preferable to set the delay period to a length of, for example, around three to five cycles in order to accurately perform failure detection control. It is thereby possible to suppress oil suction to a minimum while preventing erroneous detection of a failure.

(Second Valve Stopping Control)

On the other hand, the second valve stopping control shown in FIG. 8 is executed when a fuel-cut operation in which the crankshaft 16 stops is executed. In this case, fuel-cut operations in which the crankshaft 16 stops include: (1) a fuel-cut operation performed when the engine is stopped in a state in which an inertial force of the vehicle does not act on the crankshaft 16 (state in which the vehicle has stopped or the like); (2) in a hybrid vehicle, a fuel-cut operation performed in a case where, while the vehicle is running, the crankshaft 16 is disconnected from the power system and rotation thereof is stopped; and (3) a fuel-cut operation that is performed when the engine is stopped together with the crankshaft 16 in a case where the ignition key is not turned to the "off" position during idling stop control.

In a case where a fuel-cut operation in which the crankshaft 16 stops is executed, there is a risk that the crankshaft 16 will stop at a time point at which valve stopping corresponding to only one of closed-valve stopping and open-valve stopping is executed and that the valve stopping control will be incomplete. Particularly, with a hydraulic variable valve mechanism or the like, since the variable valve mechanism does not operate when the supply of hydraulic pressure ends due to stopping of the crankshaft 16, it is necessary to complete valve stopping control as early as possible during rotation of the crankshaft 16. Therefore, according to the second valve stopping control, when a decision to execute a fuel-cut operation has been made, the exhaust valve 32 is subjected to open-valve stopping at the aforementioned earliest position and, further, closed-valve stopping of the intake valve 30 is also executed at a timing that is as early as possible. Therefore, closed-valve stopping of the intake valve and open-valve stopping of the exhaust valve are executed in the same combustion cycle.

According to the above described second valve stopping control, the following advantageous effects can be obtained. First, even when using a hydraulic variable valve mechanism or the like, valve stopping control (both closed-valve stopping and open-valve stopping) when the engine is stopped can be reliably completed, and advantageous effects when restarting that are obtained by the valve stopping control can be stably exerted. Further, a period in which only the intake valve is stopped can be shortened to less than a single cycle, and oil suction (the amount of oil consumption) can be suppressed to a minimum.

[Specific Processing to Realize Embodiment 2]

Next, specific processing for implementing the above described control is described with reference to FIG. 9. FIG. 9 is a flowchart that illustrates control that is executed by the ECU according to Embodiment 2 of the present invention. It is assumed that the routine shown in FIG. 9 is repeatedly executed while the vehicle is operating (also including when the engine stops). According to the routine shown in FIG. 9, first, in step 200, the ECU 50 determines whether or not the current timing is a timing at which to execute a fuel-cut operation. If the result determined in step 200 is affirmative, in step 202 the ECU 50 determines whether or not the fuel-cut operation is an operation in which rotation of the crankshaft 16 continues.

Examples of the specific determination processing in step 202 are as follows: (1) in a hybrid vehicle, processing that determines whether or not the crankshaft 16 is caused to run idle by the motor during a fuel-cut operation, for example, based on a signal that is inputted from an ECU for running control that controls the power distribution of the engine and motor; (2) processing that determines that the crankshaft 16 runs idle in the fuel-cut operation during running in a non-hybrid vehicle or the like; and (3) processing that determines that the crankshaft 16 stops in a case where the ignition key is turned to the "off" position or a case where a request to stop the engine has been generated by idling stop control.

In step 202, if it is determined that rotation of the crankshaft 16 continues, the ECU 50 executes the first valve stopping control. In this case, first, in step 204, the ECU 50 subjects the intake valve 30 to closed-valve stopping. Next, in step 206, the ECU 50 executes failure detection control with respect to the intake valve 30. Subsequently, in step 208, the ECU 50 subjects the exhaust valve 32 to open-valve stopping. In contrast, in step 202, if it is determined that rotation of the crankshaft 16 stops, the ECU 50 executes the second valve stopping control. In this case, in steps 210 and 212, the ECU 50 executes closed-valve stopping of the intake valve 30 and open-valve stopping of the exhaust valve 32 during the same combustion cycle.

According to the present embodiment configured in this manner also, approximately the same operational advantages as in the foregoing Embodiment 1 can be obtained. In particular, according to the present embodiment, the first and second valve stopping controls can be appropriately used in accordance with the rotational state of the crankshaft 16 at the time of a fuel-cut operation, and the advantageous effects of valve stopping control in the respective operating states can be exerted to the maximum.

Figure 9:
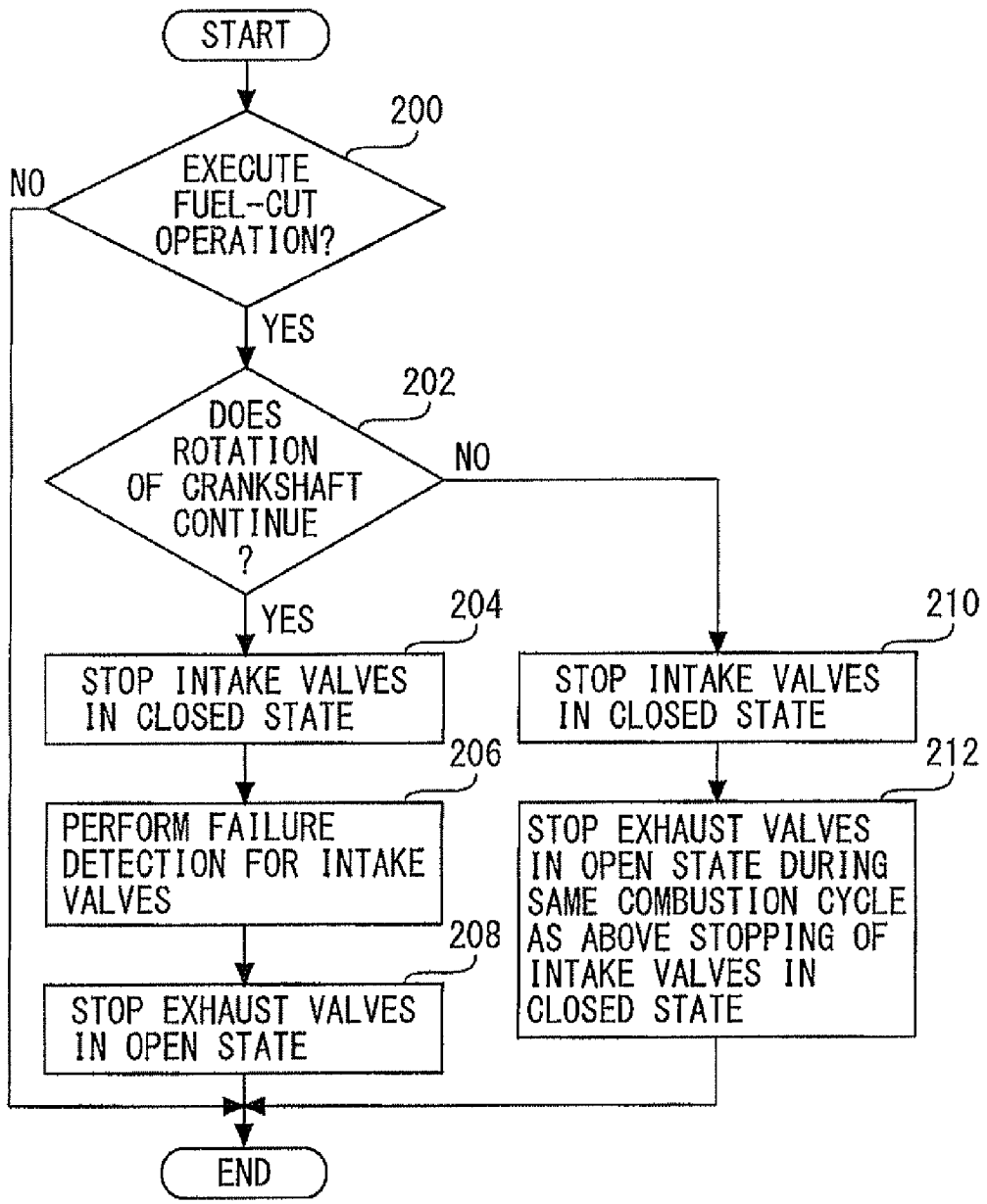
FIG. 9 is a flowchart that illustrates control that is executed by the ECU according to Embodiment 2 of the present invention.

Note that, in the above described Embodiment 2, steps 202 and 208 in FIG. 9 represent a specific example of valve stopping control means according to claim 2 and a specific example of first valve stopping control means according to claim 4. Further, steps 210 and 212 represent a specific example of valve stopping control means according to claim 3 and a specific example of second valve stopping control means according to claim 4. Furthermore, steps 200 and 202 represent a specific example of control switching means according to claim 4, and step 206 represents a specific example of intake failure detection means according to claim 5.

In addition, although in Embodiment 2 a configuration is adopted that appropriately uses the first and second valve stopping controls according to the situation, according to the present invention it is not necessarily the case that these valve stopping controls must be used together. More specifically, according to the present invention, a configuration may also be adopted which, regardless of the rotational state of the crankshaft 16 at the time of a fuel-cut operation, executes only one of the first and second valve stopping controls, and does not adopt the other control.

Further, according to Embodiment 2, an example is described in which failure detection control with respect to the intake valve 30 is executed based on the intake air pressure. However, the present invention is not limited thereto, and a configuration may also be adopted that executes failure detection control based on an arbitrary parameter other than the intake air pressure as long as the parameter is one in which the operating state of the intake valve 30 is reflected. As one example, according to the present invention, a failure of the intake valve 30 may also be detected based on the torque of the engine. When the intake valve 30 stops in a closed state normally, the torque decreases compared to a case where normal opening/closing operations are performed, and hence a failure can be detected based on this tendency. Note that, the torque may be calculated based on the number of engine revolutions or the load or the like, or may be detected by a sensor.

Embodiment 3

Next, Embodiment 3 of the present invention is described with reference to FIG. 10 to FIG. 12. A feature of the present embodiment is that, in addition to having a similar configuration and executing similar control to the above described Embodiment 1, valve reversion control is executed when reverting from a fuel-cut operation. Note that, according to the present embodiment, components that are the same as in Embodiment 1 are denoted by the same reference symbols, and a description of such components is omitted hereunder.

[Features of Embodiment 3]

Figure 10:
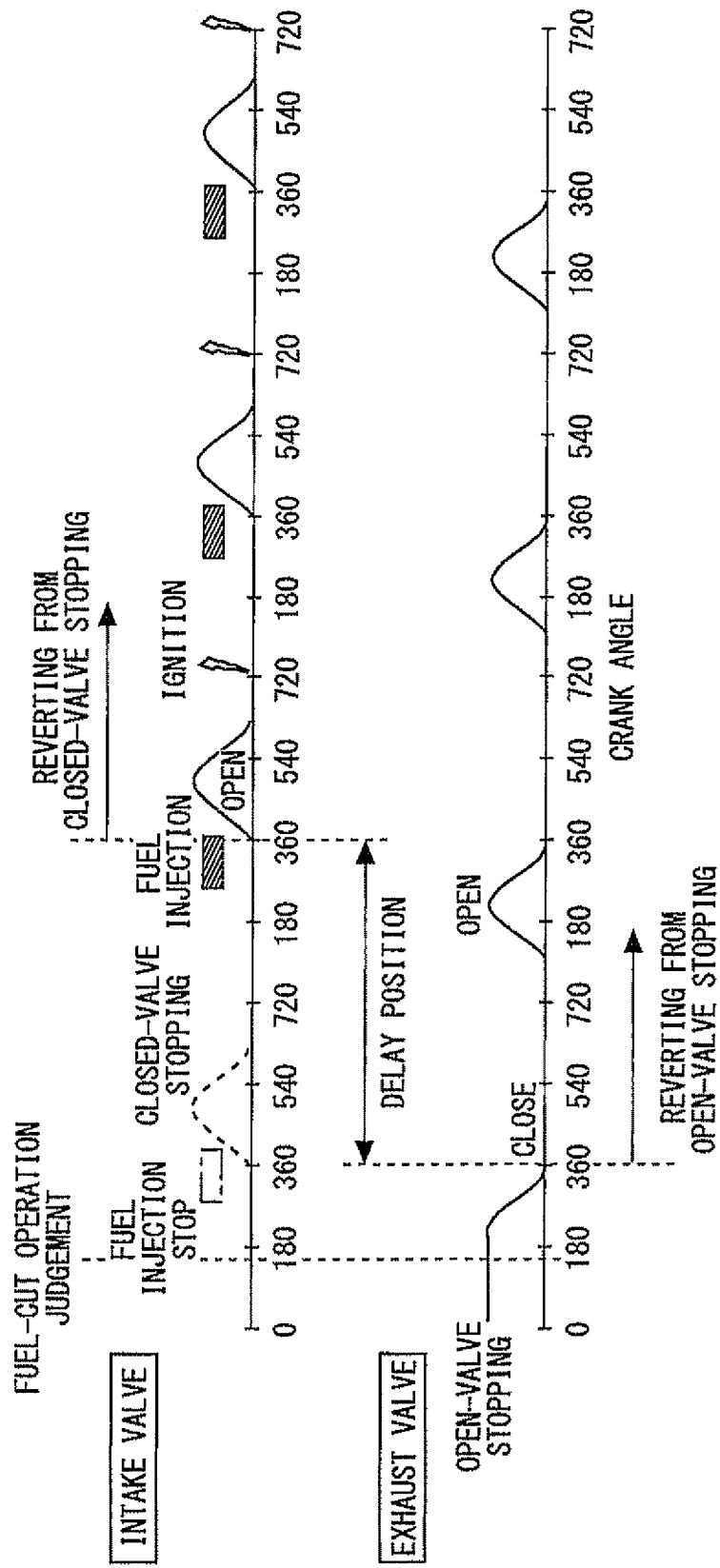
FIG. 10 is a timing chart that illustrates operating-time valve reversion control that is performed when revelling from a fuel-cut operation.
Figure 11:
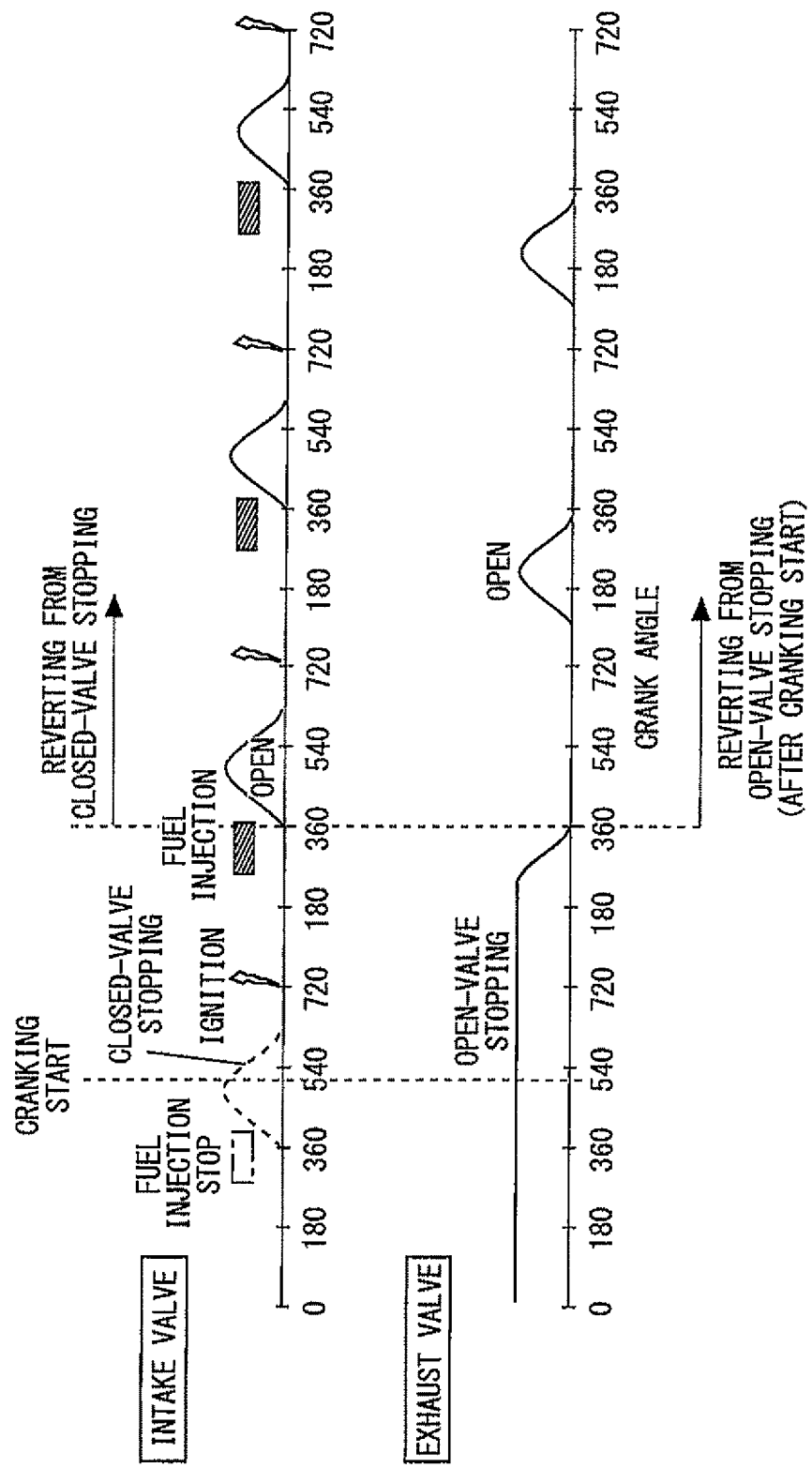
FIG. 11 is a timing chart that illustrates starting-time valve reversion control that is performed when restarting the engine according to Embodiment 3 of the present invention.

FIG. 10 is a timing chart that illustrates operating-time valve reversion control that is performed when reverting from a fuel-cut operation, and FIG. 11 is a timing chart that illustrates starting-time valve reversion control that is performed when restarting the engine according to Embodiment 3 of the present invention. According to the present embodiment a configuration is adopted that executes the operating-time valve reversion control when reverting from a fuel-cut operation in which the crankshaft 16 runs idle, and executes the starting-time valve reversion control when reverting from a fuel-cut operation in which the crankshaft 16 is stopped (that is, when restarting the engine). These valve reversion controls are described hereunder.

(Operating-Time Valve Reversion Control)

When reverting from a fuel-cut operation, the intake valve 30 and the exhaust valve 32 are caused to revert from a stopped state. However, when the crankshaft 16 is rotating (running idle), if reversion of the intake valve 30 is performed first, both of the valves 30 and 32 will enter an open state, and hence intake air will be supplied to the catalyst 24 by the reciprocating motion of the piston. Consequently, in the operating-time valve reversion control, as shown in FIG. 10, when reverting from a fuel-cut operation in which the crankshaft 16 is in an idle running state, first, the exhaust valve 32 is caused to revert from open-valve stopping (=close), and thereafter the intake valve 30 is caused to revert from closed-valve stopping (=open) in synchrony with fuel injection. It is thereby possible to reliably prevent a situation in which the intake valve 30 opens first and intake air reaches the catalyst 24 when reverting from a fuel-cut operation also.

(Exhaust Valve Failure Detection Control)

In the above described operating-time valve reversion control, a delay period arises from a time point at which it is estimated that the exhaust valve 32 has reverted until the intake valve 30 reverts (see FIG. 10). A configuration may be adopted that executes failure detection control with respect to the exhaust valve 32, described below, during this delay period. Similarly to the failure detection control described according to Embodiment 1, this failure detection control is executed based on an intake air pressure detected by the intake air pressure sensor 42. In a case where the exhaust valve 32 has reverted (closed) normally, an intake negative pressure increases compared to a case where open-valve stopping thereof is being maintained. For example, an intake air pressure (negative pressure) in a state in which the exhaust valve 32 opens and closes normally is previously stored as a determination value in the ECU 50.

According to the failure detection control, during a delay period in which it is estimated that reversion from open-valve stopping is completed, when a detection value of the intake air pressure is higher than the aforementioned determination value, the ECU 50 determines that a failure has occurred in which the exhaust valve 32 does not revert from open-valve stopping. Further, when the detection value of the intake air pressure is approximately equal to the determination value, the ECU 50 determines that the exhaust valve 32 is normal. Thus, according to the present embodiment, even without executing valve control for failure detection or the like, a failure of the exhaust valve 32 can be easily detected by utilizing a delay period at a time of valve reversion. Note that, when executing the above described failure detection control, it is preferable to previously confirm by means of another failure detection control that the intake valve 30 is normal.

(Starting-Time Valve Reversion Control)

On the other hand, when restarting the engine, the starting-time valve reversion control shown in FIG. 11 is executed. As shown in FIG. 11, in the starting-time valve reversion control, first the intake valve 30 is caused to revert from closed-valve stopping. Further, at the same time as reversion of the intake valve 30 or after the reversion has been performed, the exhaust valve 32 is caused to revert from open-valve stopping. Therefore, when restarting, the intake valve 30 can be caused to open before the exhaust valve 32 closes, and a situation in which the inside of the cylinder enters an airtight state at cranking time can be avoided. As a result, the cranking load can be reduced, and hence the electric power consumption of the starter can be decreased and vibrations at cranking time can be lessened.

In addition, according to the starting-time valve reversion control, after cranking has started (preferably, after the number of engine revolutions produced by cranking has risen moderately), the exhaust valve 32 is caused to revert from open-valve stopping. Consequently, in at least an initial stage of cranking, the exhaust valve 32 can be caused to open, and an adequate rotational inertial force can be imparted to a flywheel or the like in a state in which the resistance of the piston (crankshaft) is small. Accordingly, even if the exhaust valve 32 closes and the rotational resistance of the crankshaft 16 increases, the load of the starter can be reduced by utilizing the rotational inertial force of the flywheel or the like, and the electric power consumption of the starter can be further reduced.

[Specific Processing to Realize Embodiment 3]

Next, specific processing for implementing the above described control is described with reference to FIG. 12. FIG. 12 is a flowchart that illustrates control that is executed by the ECU according to Embodiment 3 of the present invention. It is assumed that the routine shown in FIG. 12 is repeatedly executed while the vehicle is operating (including at startup) concurrently with the routine shown in FIG. 6 or FIG. 9 described above. According to the routine shown in FIG. 12, first, in step 300, based on an output of the sensor system, the ECU 50 determines whether or not the current timing is a timing at which to revert from a fuel-cut operation. If the result determined in step 300 is affirmative, in step 302 the ECU 50 determines whether or not the current timing is an engine restarting time.

If the current timing is not an engine restarting time, that is, when reverting from a fuel-cut operation in which the crankshaft 16 runs idle, first, in step 304, the ECU 50 causes the exhaust valve 32 to revert from open-valve stopping. Next, in step 306, the ECU 50 executes failure detection control with respect to the exhaust valve 32. Thereafter, in step 308, the ECU 50 causes the intake valve 30 to revert from closed-valve stopping. In contrast, at an engine restarting time, in step 310, the ECU 50 starts cranking, and in step 312 the ECU 50 causes the intake valve 30 to revert from closed-valve stopping. Next, in step 314, the ECU 50 causes the exhaust valve 32 to revert from open-valve stopping.

Thus, according to the present embodiment, in addition to the operational advantages at the time of a fuel-cut operation described in Embodiment 1, the various operational advantages described above can be obtained when reverting from a fuel-cut operation also. In particular, according to the present embodiment the operating-time valve reversion control and the starting-time valve reversion control can be appropriately used in accordance with the form of reversion from a fuel-cut operation (normal reversion in which the crankshaft 16 runs idle, or reversion when restarting the engine), and the advantageous effects of the valve reversion control can be exerted to the maximum in respective operating states.

Figure 12:
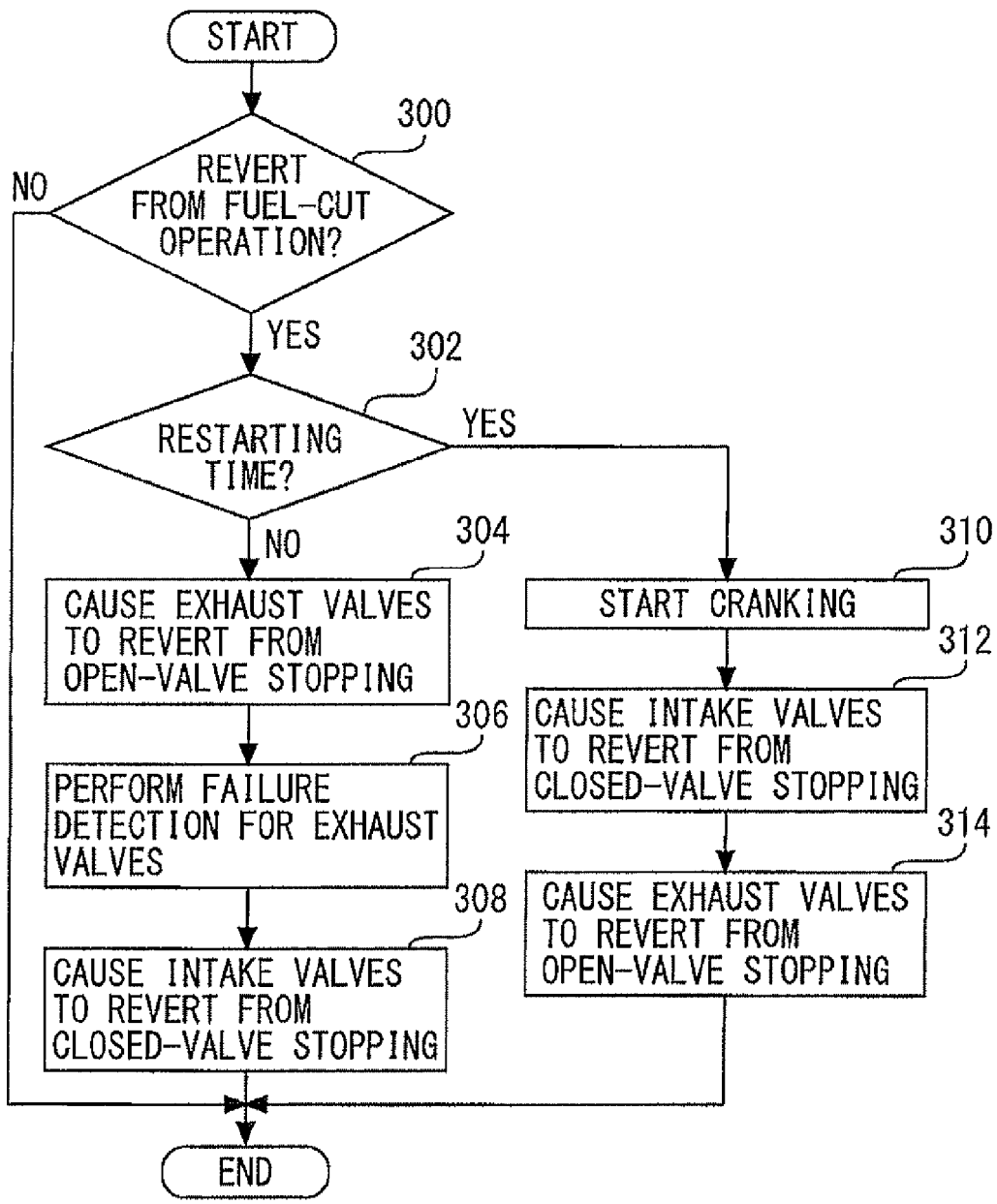
FIG. 12 is a flowchart that illustrates control that is executed by the ECU according to Embodiment 3 of the present invention.

Note that, in the above described Embodiment 3, steps 304 and 308 in FIG. 12 represent a specific example of operating-time valve reversion control means according to claim 6, and steps 310, 312 and 314 represent a specific example of starting-time valve reversion control means according to claims 8 and 9. Further, step 306 represents a specific example of exhaust failure detection means according to claim 7.

In addition, although in Embodiment 3 a configuration is adopted that appropriately uses the operating-time valve reversion control and the starting-time valve reversion control according to the situation, according to the present invention it is not necessarily the case that these valve reversion controls must be used together. More specifically, according to the present invention, a configuration may also be adopted which executes the operating-time valve reversion control when reverting from a normal fuel-cut operation and does not adopt the starting-time valve reversion control, or a configuration may also be adopted which executes the starting-time valve reversion control when restarting the engine and does not adopt the operating-time valve reversion control.

Further, according to Embodiment 3, an example is described in which failure detection control with respect to the exhaust valve 32 is executed based on the intake air pressure. However, the present invention is not limited thereto, and a configuration may also be adopted that, similarly to when performing failure detection control with respect to the intake valve that is described above, for example, executes failure detection control based on other parameters including the torque.

Furthermore, according to Embodiment 3, control when reverting from a fuel-cut operation is added to the control of Embodiment 1. However, the present invention is not limited thereto, and the operating-time valve reversion control or the starting-time valve reversion control of Embodiment 3 may also be added to the control of Embodiment 2.

DESCRIPTION OF REFERENCE NUMERALS

10 engine (internal combustion engine), 12 piston, 14 combustion chamber, 16 crankshaft, 18 intake passage, 20 exhaust passage, 22 throttle valve, 24 catalyst, 26 fuel injection valve, 28 spark plug, 30 intake valve, 32 exhaust valve, 34 intake variable valve mechanism, 36 exhaust variable valve mechanism, 40 airflow sensor, 42 intake air pressure sensor (valve state detection means), 50 ECU

The invention claimed is:

1. A control apparatus for an internal combustion engine, comprising:
    an intake closed-valve stopping mechanism that is capable of stopping an intake valve in a closed state;
    an exhaust open-valve stopping mechanism that is capable of stopping an exhaust valve in an open state; and
    valve stopping control unit that, in a case of executing a fuel-cut operation, including at a time the internal combustion engine is stopped, causes all intake valves in all cylinders to stop in a closed state by means of the intake closed-valve stopping mechanism, and causes at least one exhaust valve in all cylinders to stop in an open state by means of the exhaust open-valve stopping mechanism,
    the valve stopping control unit is configured to stop the exhaust valves in an open state at the timing which is delayed by at least one combustion cycle or more after stopping the intake valves in a closed state.

2. The control apparatus for an internal combustion engine, according to claim 1, wherein
    the valve stopping control unit comprises first valve stopping control unit that stops the exhaust valves in an open state at the timing which is delayed by at least one combustion cycle or more after stopping the intake valves in a closed state, and second valve stopping control unit that executes an operation that stops the intake valves in a closed state and an operation that stops the exhaust valves in an open state during a same combustion cycle;
    the control apparatus further comprising control switching unit that actuates the first valve stopping control unit in a case where a fuel-cut operation is executed in which rotation of a crankshaft continues by an external force acting on the crankshaft after the internal combustion engine is stopped, and actuates the second valve stopping control unit in a case where a fuel-cut operation is executed in which the crankshaft stops by the external force not acting on the crankshaft after the internal combustion engine is stopped.

3. The control apparatus for an internal combustion engine according to claim 1, further comprising:
    valve state detection unit that detects a parameter in which an operating state of the intake valves is reflected; and
    intake failure detection unit that performs failure detection with respect to the intake valves by means of the valve state detection unit during a delay period which is at least one combustion cycle or more, and the delay period is a period from a time point at which it is estimated that the intake valves stop in a closed state until the exhaust valves stop in an open state.

4. The control apparatus for an internal combustion engine according to claim 1, further comprising operating-time valve reversion control unit that, in a case of reverting from a fuel-cut operation in a state in which the crankshaft of the internal combustion engine rotates, causes the intake valves to revert from a stopped state after causing the exhaust valves to revert from a stopped state.

5. The control apparatus for an internal combustion engine according to claim 4, further comprising:
    valve state detection unit that detects a parameter in which an operating state of the exhaust valves is reflected; and
    exhaust failure detection unit that performs failure detection with respect to the exhaust valves by means of the valve state detection unit during a period from a time point at which it is estimated that the exhaust valves revert from a stopped state until the intake valves revert from a stopped state.

6. The control apparatus for an internal combustion engine according to claim 1, further comprising starting-time valve reversion control unit that, in a case of restarting the internal combustion engine, causes the intake valves to revert from a stopped state, and causes the exhaust valves to revert from a stopped state at a time point at which the intake valves revert or thereafter.

7. The control apparatus for an internal combustion engine according to claim 6, wherein the starting-time valve reversion control unit is configured to cause the exhaust valves to revert from a stopped state after cranking is started.

* * * * *